(12) United States Patent
Pose

(10) Patent No.: US 8,287,211 B2
(45) Date of Patent: Oct. 16, 2012

(54) METHODS OF LAYING ELONGATE ARTICLES AT SEA

(75) Inventor: Jean Baptiste Pose, Aberdeen (GB)

(73) Assignee: Subsea 7 Contracting (UK) Limited, Westhill (GB)

( * ) Notice: Subject to any disclaimer, the term of this patent is extended or adjusted under 35 U.S.C. 154(b) by 0 days.

(21) Appl. No.: 12/600,810

(22) PCT Filed: May 28, 2008

(86) PCT No.: PCT/GB2008/050383
§ 371 (c)(1), (2), (4) Date: Apr. 7, 2010

(87) PCT Pub. No.: WO2008/146043
PCT Pub. Date: Dec. 4, 2008

(65) Prior Publication Data
US 2010/0196101 A1 Aug. 5, 2010

(30) Foreign Application Priority Data
May 31, 2007 (GB) .................................. 0710357.5

(51) Int. Cl.
*F16L 1/16* (2006.01)
(52) U.S. Cl. ...................................................... 405/170
(58) Field of Classification Search .................. 405/158, 405/166, 169, 170; 166/345
See application file for complete search history.

(56) References Cited

U.S. PATENT DOCUMENTS

| 4,541,753 A | 9/1985 | Langner |
| 4,717,287 A * | 1/1988 | Laursen ...................... 405/169 |
| 5,320,175 A | 6/1994 | Ritter |
| 6,149,347 A * | 11/2000 | Scott ............................ 405/167 |
| 2003/0099515 A1 | 5/2003 | Giovanni |

FOREIGN PATENT DOCUMENTS
GB 2 335 722 A 9/1999
* cited by examiner

*Primary Examiner* — Frederick L Lagman
*Assistant Examiner* — Kyle Armstrong
(74) *Attorney, Agent, or Firm* — Levy & Grandinetti

(57) ABSTRACT

A method for pipelaying at sea from a vessel, wherein the length of each pipe string is less than the depth of the sea at the laying site, is described. The method includes attaching a string to a line on the vessel. The string is deployed and suspended by the vessel via the line substantially above the end of the pipeline to which it will be connected. The line is paid out until the lower end of the string is lowered to the end of the string to which it will be connected. With the string in a vertical configuration and the end of the pipeline substantially in its installed configuration, the end of the string is connected to the end of the pipeline. The vessel is moved in the lay direction and the line is paid out until the string is laid into its installed configuration.

13 Claims, 4 Drawing Sheets

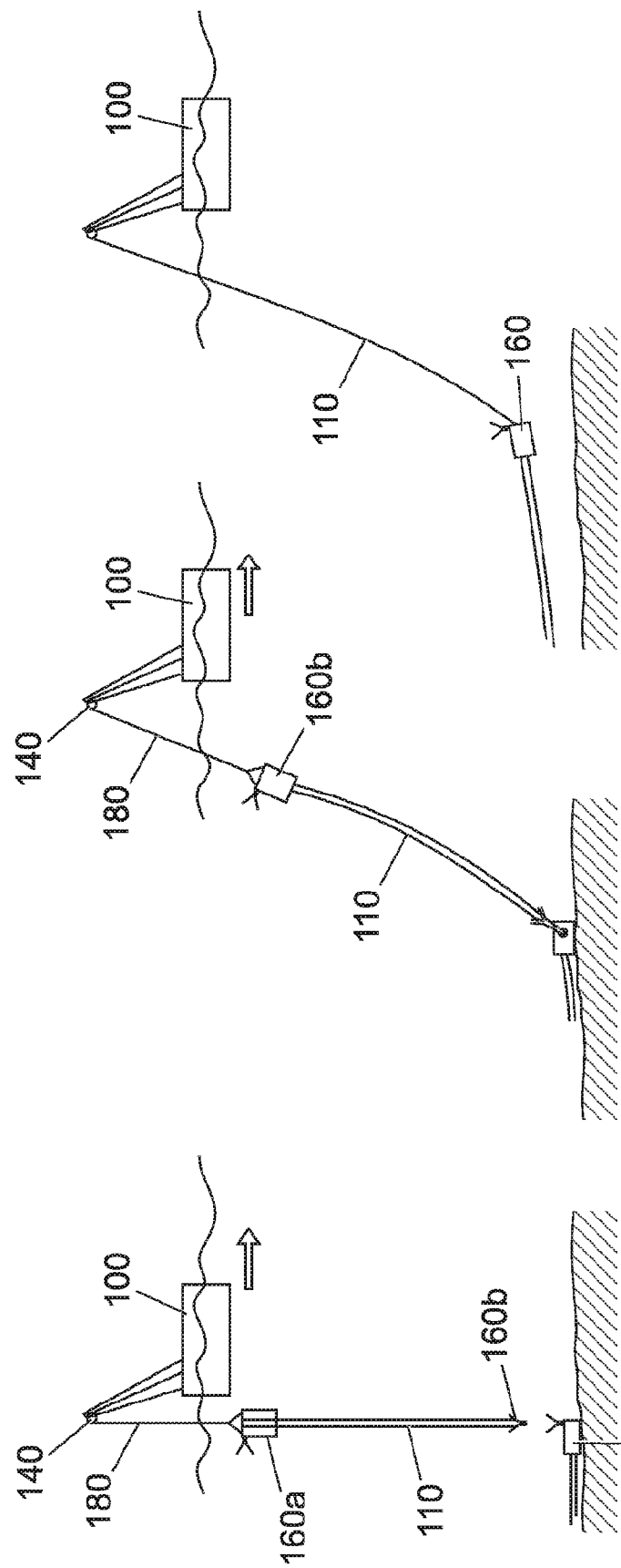

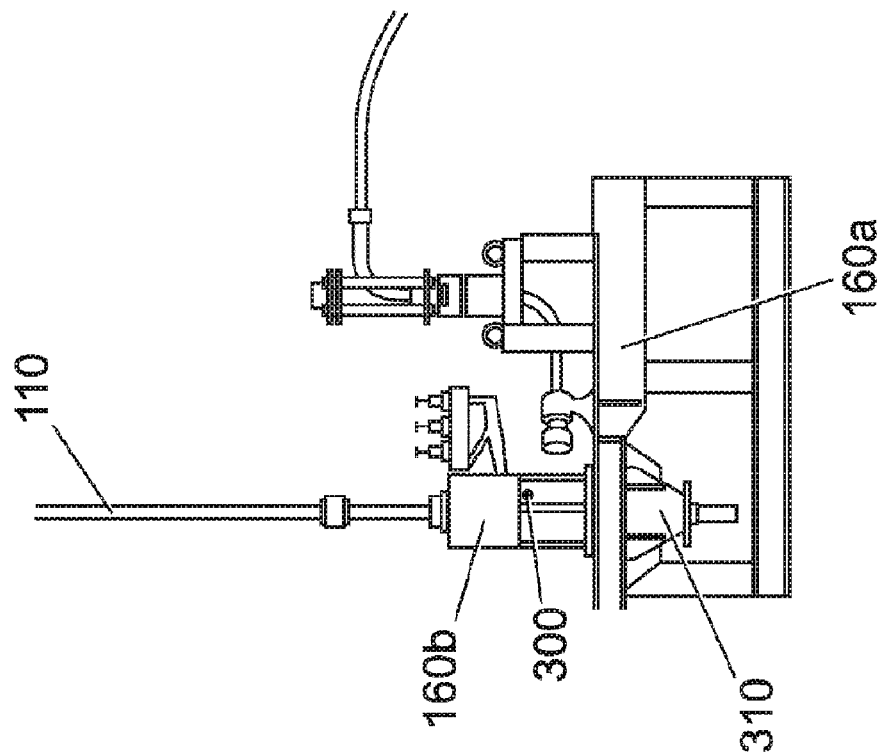
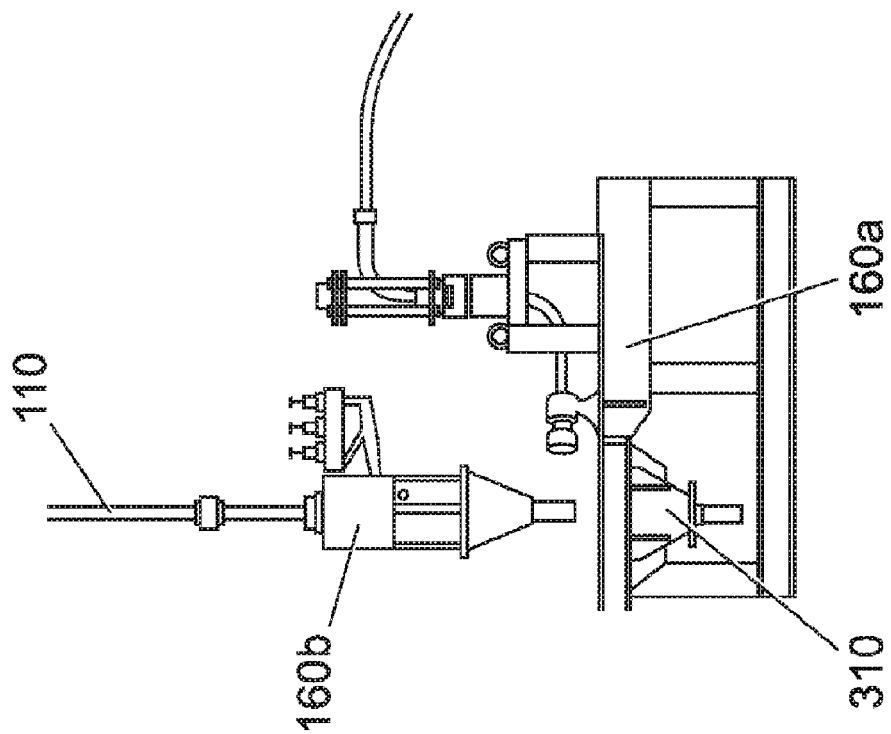

METHODS OF LAYING ELONGATE ARTICLES AT SEA

This Application is the U.S. National Phase of International Application Number PCT/GB2008/050383, filed on May 28, 2008, which claims priority to Great Britain Application Number 0710357.5, filed on May 31, 2007.

This application relates to methods of laying elongate articles, such as rigid pipe, at sea, and in particular to methods of laying subsea pipe at depths beyond the normal capability of the pipelaying vessel being used.

A number of different methods of installing underwater pipeline are known. For example, it is known to install an underwater pipeline from a vessel by what is known as a "J-lay" method. Pipeline is J-laid using a J lay tower. Such a tower is a purpose built apparatus comprising essentially a main mast structure, a working platform, an erector, a travelling block and a stinger. The erector raises a pipeline section from horizontal on the ship's deck to an upright position within the mast, where it is supported and welded to the pipeline. The travelling block holds the pipeline section and lowers it (once connected), through the rotary table on the vessel and via the stinger, which comprises internal rollers to prevent over-bending of the pipeline, into the sea. Thus, the pipe is lowered vertically from the vessel and curves towards a generally horizontal orientation on the seabed, forming a generally "J" or catenary shape.

For deep water, a steep angle of departure of the pipeline into the water must be arranged, using track tensioners, or other tensioning means such as movable clamps, in order to align with the natural catenary curve of the suspended pipeline. However as depth increases, the top tension required to hold the suspended catenary length also increases. Each pipelaying vessel will consequently have a maximum water depth, for a given pipe type, that it can operate in before the top tension becomes too great for that vessel.

Therefore, to use a pipelaying vessel to lay in water depth greater than it is normally capable of doing so would conventionally require a very high investment in upgrading the vessel and its top tension capability. Alternatively buoyancy could be added to the pipe being laid, but this still significantly increases costs (buoyancy is expensive), time and complexity in installing the buoyancy (most of the time it cannot be preinstalled onshore), handling the pipe and recovering the buoyancy modules once laid. Furthermore buoyancy takes significant storage space.

Accordingly, it would be desirable to enable use of a pipelaying vessel to lay subsea pipelines at depths which would be normally outside the vessel's capabilities due to the top tension resulting from the pipe's suspended weight at such depths, without the need to substantially increase the top tension capability of the vessel or use buoyancy on the pipe.

In a first aspect of the invention there is provided a method for laying elongate articles from a vessel at sea in order to form a substantially continuous structure, wherein the length of each elongate article is less than the depth of the sea at the laying site, the method comprising:

attaching one of said elongate articles to a line on board said vessel;

deploying said elongate article such that it is suspended by said vessel via said line substantially above the end of the continuous structure to which it is to be connected;

paying out said line until the lower end of said elongate article is lowered to the end of the continuous structure to which it is to be connected;

with said elongate article still in a substantially vertical configuration and said end of the continuous structure substantially in its installed configuration, connecting the lower end of said elongate article to said end of the continuous structure, said end of the continuous structure being in its installed configuration;

moving said vessel in the lay direction; and paying out said line until said elongate article is laid into its installed configuration.

The "upper end" of said elongate article, in its installed configuration, now forms the end of the continuous structure to which the next elongate element is to be connected and the method can be repeated.

The terms "upper end" and "lower end" of said elongate article refer respectively to the upper end and lower end of the elongate article when suspended in a vertical configuration, as in the deployment step.

The main connecting step refers to the making of the main physical or structual connection between the elongate article and the continuous structure. Actual flowline connection may be necessary at a later stage to actually allow fluid to flow through the connection.

U.S. Pat. No. 6,149,347 discloses a method for laying pipe in sections shorter than the sea depth, in order to increase production speed in comparison with J-Lay. However, this does not allow for the possibility of the new section to be attached to the end of the pipeline after the end of the pipeline has been laid in its installed position on the seabed. Instead, the end of the pipeline the new section is being attached to needs to be held up, off the floor, by a second line, so that this end is in a vertical configuration. This is considerably slower and more complicated than the above method.

Said connecting step may be done with said end of the continuous structure lying on the seabed.

Said method may be performed at a site where the sea depth is such that the tension generated on said vessel by suspending a pipe extending from said vessel to the seabed exceeds the maximum tension that the vessel is designed to handle, the vessel therefore being unable to use conventional J-lay techniques at such a depth.

Said connecting step may comprise lowering said elongate article into a connector that allows said elongate article to move from a substantially vertical configuration when it is first connected to the end of said continuous structure, to a substantially horizontal configuration when laid in its installed position. Such a connector may be a stab and hinge connector. Said elongate element may be provided with suitable connection means at each end prior to deployment. An ROV may be used to complete the connection once said elongate article is in its installed position.

Said elongate article may be fabricated on-board said vessel prior to attachment to a line and/or deployment. In an embodiment of the invention said fabrication is done while a previously fabricated elongate article is being laid according to the above method.

Said method may further comprise fabricating a number of elongate articles in advance of laying, and storing them on said vessel. Said number of elongate articles may be stored suspended from said vessel.

Said elongate articles may be erected to a vertical orientation and lowered from the vessel into the sea by a single pipelay tower, such as that used in J-lay, prior to being suspended from, and lowered to the seabed by, said line.

Said line may be part of an Abandonment and Recovery (A&R) winch. Said winch may form part of a crane structure.

BRIEF DESCRIPTION OF THE DRAWINGS

Embodiments of the invention will now be described, by way of example only, by reference to the accompanying drawings, in which:

FIGS. 2a-2c shows three different stages of the deployment of a pipe string in accordance with an embodiment of the invention; and FIGS. 3a-3d show four different stages of connecting the string to the pipeline in accordance with an embodiment of the invention.

DETAILED DESCRIPTION OF THE EMBODIMENTS

To lay pipe at depths at which it is not possible to hold the entire catenary weight from the surface, due to the resultant top tensions encountered being beyond the operational capability of the vessel, it is proposed to deploy the pipe in sections (strings) using a single winch or a single crane. Each string should be short enough to be within the capabilities of the vessel to handle, and therefore will be shorter than the sea depth at the installation site.

Figure 1:
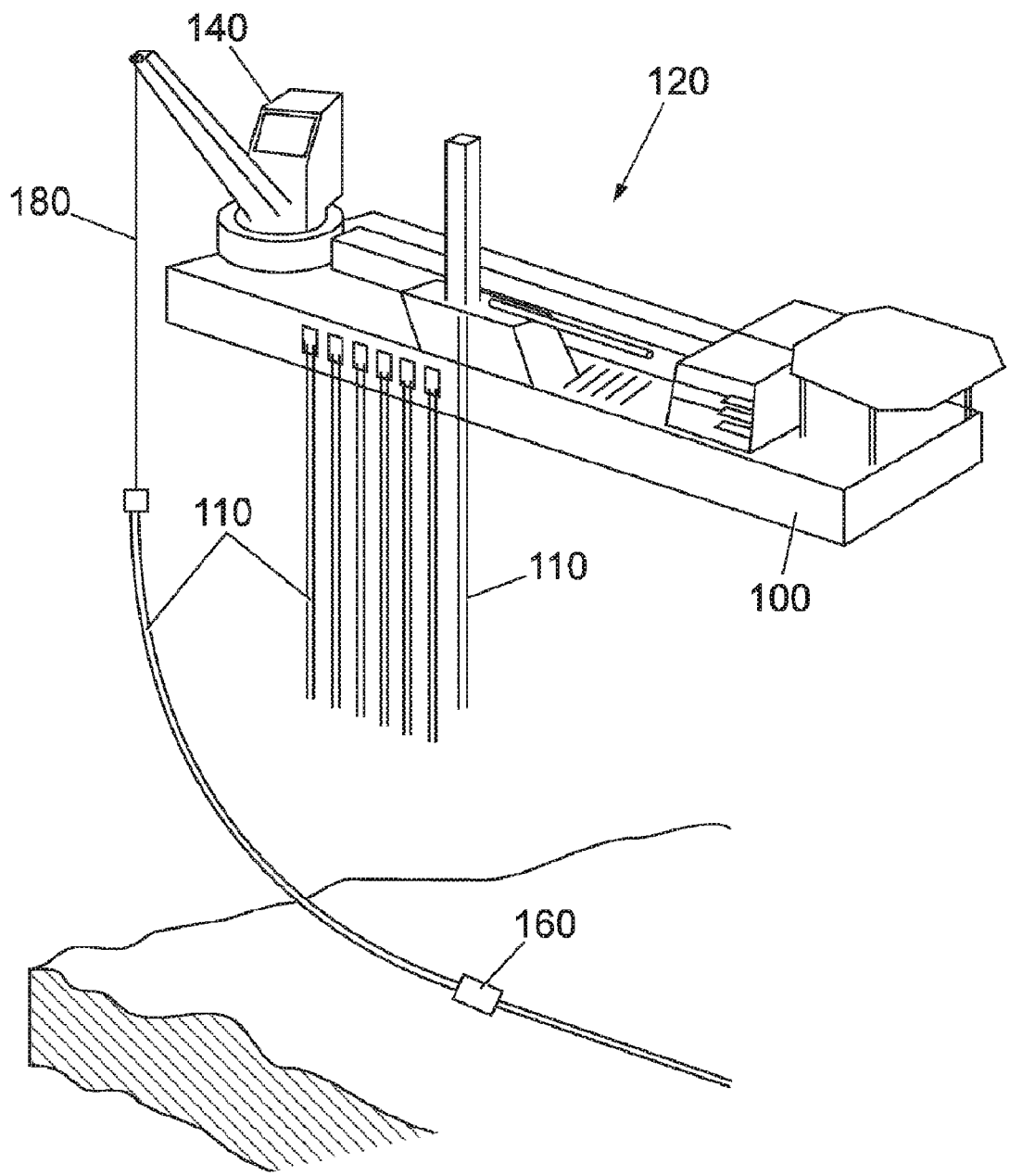
FIG. 1 shows a vessel laying pipeline according to an embodiment of the invention.

FIG. 1 shows a vessel 100 laying pipeline strings 110 as proposed. The vessel is essentially split into three stations, a string production station A, a string storage station B and a string deployment station C. The string production station comprises a J-lay tower 120, from which pipe would normally be deployed using the J-lay method at depths within the capabilities of the vessel. The string storage station comprises means from which fabricated strings can be suspended prior to deployment such as pre-suspended pennants attached to outriggers. The string deployment station comprises a "Clyde" crane 140 with associated abandonment and recovery (A & R) winch or other suitable hoisting means.

The proposed lay method is as follows: Firstly each string 110 is fabricated on the deck and erected vertically using the erector of the J lay tower 120, the top and bottom ends of the string 110 having respective parts of a pipeline connector 160a, 160b attached thereto. The type of connector used in this example is a stab-in hinge connector.

As each string is completed it is connected to the J-Lay tower 120 A&R (abandonment and recovery) equipment, and to the pennant lower extremity, this having been recovered to deck to allow connection. It is then lowered by the J-lay tower into the sea. As the string head is being lowered below water, the load is naturally transferred from the J-lay tower 120 equipment system to the pennant and therefore the string storage system B, where it remains suspended by the vessel.

An ROV can then assist with the disconnection of the A&R wire from the pennant/head of the string.

When a string is ready to be deployed from string storage section B, the line 180 from the winch on crane 140 is attached to the string's upper pennant end and its weight is transferred to the winch. The string 110 is now ready to be deployed to the seabed by the winch.

FIGS. 2a to 2c show the deployment steps in more detail:

FIG. 2a shows the situation just after the winch has taken the weight of string 110, it being suspended via line 180. The vessel 100 is in position such that the string 110 is held above the end of the pipeline it is to be connected to. This end of the pipeline will be, of course, the top of the last string deployed (unless the string being deployed is the first), and therefore the stab and hinge top termination 160a attached thereto.

As the winch pays out its line 180, the string 110 (and its stab and hinge bottom termination 160b) is lowered to the stab and hinge top termination 160a on the seabed. The lower end of the string 110 is then lowered ("stabbed") into a receptacle on the stab and hinge top termination 160b, until the string 100 is held in place and connected to the pipeline.

FIG. 2b shows the next stage of deployment. In this stage the vessel 100 is moved, on the surface, in the lay direction, that is the direction in which the pipeline is to be laid. The string 110 is able to rotate from the vertical towards the horizontal of the pipeline on the seabed due to the hinge of the stab and hinge connector 160.

FIG. 2c shows the final deployment stage, where the winch is paid out, lowering the string 110 until it is laid substantially horizontal on the seabed, in its installed position. The line can now be disconnected and the next string deployed.

FIGS. 3a to 3d show the connection steps in more detail:

FIG. 3a shows the bottom end of the string 110, with its stab and hinge bottom termination 160b attached, as it is being lowered into the receptacle 310 of the stab and hinge top termination 160a on the seabed.

FIG. 3b shows the bottom end of the string 110 once the stab and hinge bottom termination 160b has been lowered into the receptacle 310 of the top termination 160a of the stab and hinge connector 160 and is connected thereto.

Figure 3D:
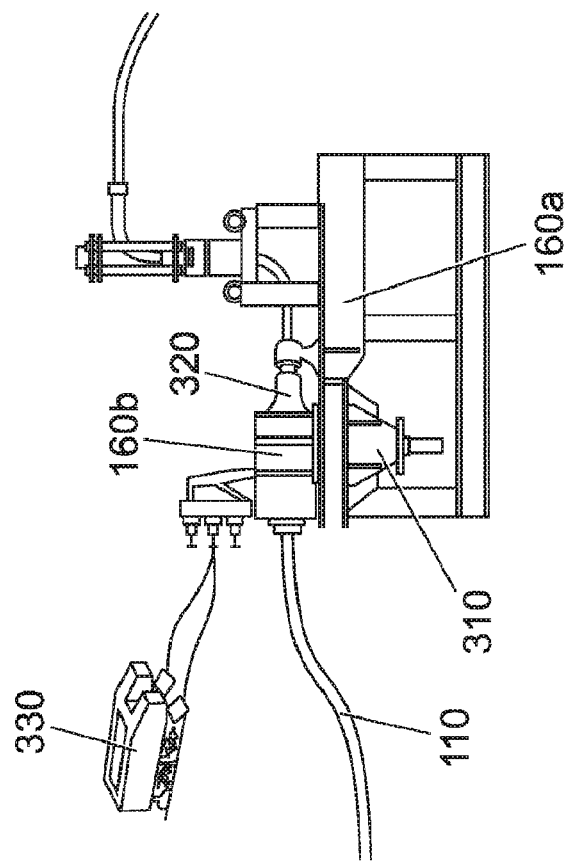
Figure 3C:
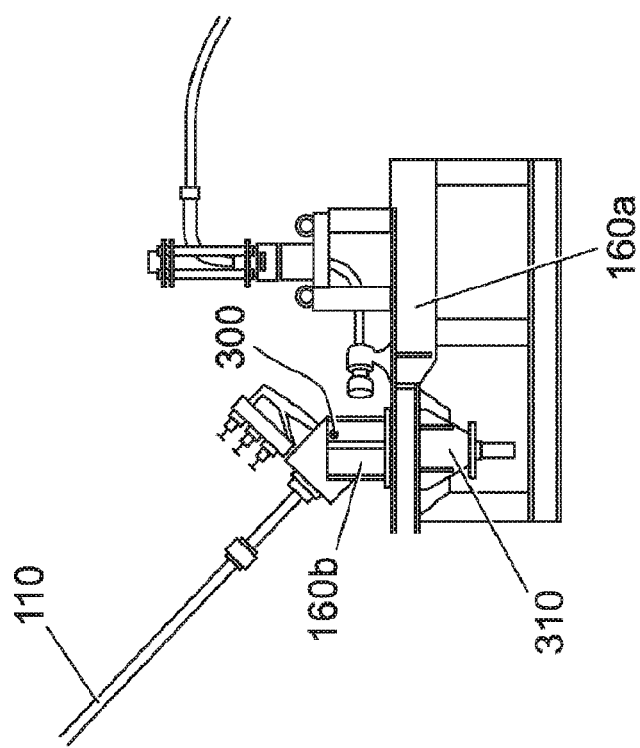

FIG. 3c shows the situation where the vessel 100 begins to move in the lay direction. The stab and hinge bottom termination 160b comprises a hinge 300 around which its top portion (and therefore the string 110), is able to rotate. Therefore the string, as it is lowered to the seabed, is able to move from its initial vertical configuration to its installed horizontal configuration.

FIG. 3d shows the string 110 in its installed position. The string 110 is substantially horizontal on the seabed (although, as shown, its level actually falls from the elevated connector to the seabed itself, and will rise to the next connector. The main pipeline is now connected to the newly installed string at connection 320. A remotely operated vehicle (ROV) 330 can now operate the connector controls to complete the connection.

The above examples are for illustration only and modifications and improvements may be incorporated without departing from the spirit and scope of the invention. For example, other types of connectors may be used than those described.

The invention claimed is:

1. A method for laying elongate articles from a vessel at sea in order to form a substantially continuous structure, wherein a length of each elongate article is less than a depth of the sea at the laying site, the methods comprising:

attaching one of said elongate articles to a line on board said vessel;

deploying said elongate article with a single crane such that said elongate article is suspended by said vessel via said line substantially above the end of the continuous structure to which said elongate article is to be connected, wherein the continuous structure is substantially in its installed configuration with said end of the continuous structure lying on the seabed and disconnected from said vessel;

paying out said line until the lower end of said elongate article is lowered to the end of the continuous structure to which it is to be connected;

with said elongate article still in a substantially vertical configuration and said end of the continuous structure substantially in its installed configuration, connecting the lower end of said elongate article to said end of the continuous structure;

moving said vessel in the lay direction; and paying out said line until said elongate article is laid into its installed configuration and disconnecting said elongate article on the seabed from said crane.

2. The method as claimed in claim 1 wherein said method is performed at a site where the sea depth is such that a tension required to suspend a pipe extending from said vessel to the seabed exceeds a maximum designated tension for the vessel, the vessel therefore being unable to use conventional J-lay techniques at such a depth.

3. The method as claimed in claim 1 wherein said connecting step comprises lowering said elongate article into a connector that allows said elongate article to move from a substantially vertical configuration when it is first connected to the end of said continuous structure, to a substantially horizontal configuration when laid in its installed position.

4. The method as claimed in claim 3 wherein such a connector is a stab and hinge connector.

5. The method as claimed in claim 3 wherein said elongate element is provided with a suitable connector at each end prior to deployment.

6. The method as claimed in claim 3 wherein a remotely operated vehicle (ROV) is used to complete the connection once said elongate article is in its installed position.

7. The method as claimed in claim 1 wherein said elongate article is fabricated on board said vessel prior to deployment.

8. The method as claimed in claim 7 wherein said fabrication is done while a previously fabricated elongate article is being laid according to the above method.

9. The method as claimed in claim 7 further comprising fabricating a number of elongate articles in advance of laying, and storing them on said vessel.

10. The method as claimed in claim 9 wherein said number of elongate articles is stored suspended from said vessel.

11. The method as claimed in claim 1 wherein said elongate articles are erected to a vertical orientation and lowered from the vessel into the sea by a J-lay tower prior to being suspended from, and lowered to the seabed by, said line.

12. The method as claimed in claim 1 wherein said line is part of an abandonment and recovery (A&R) winch.

13. The method as claimed in claim 12 wherein said winch forms part of a crane structure.

* * * * *